United States Patent [19]

Zheng

[11] Patent Number: 5,941,265
[45] Date of Patent: *Aug. 24, 1999

[54] COLLAPSIBLE STRUCTURES HAVING OVERLAPPING SUPPORT LOOPS

[75] Inventor: Yu Zheng, Covina, Calif.

[73] Assignee: Patent Category Corp., Walnut, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/717,408

[22] Filed: Sep. 20, 1996

[51] Int. Cl.⁶ .................................................. E04H 15/40
[52] U.S. Cl. ......................... 135/125; 135/126; 135/128; 160/370.21; 296/97.7
[58] Field of Search ..................... 135/124, 125, 135/126, 115, 128; 160/370.21, DIG. 2; 296/97.7, 97.8

[56] References Cited

U.S. PATENT DOCUMENTS

| | | |
|---|---|---|
| 3,960,161 | 6/1976 | Norman . |
| 3,990,463 | 11/1976 | Norman . |
| 4,165,757 | 8/1979 | Marks . |
| 4,184,501 | 1/1980 | Johnson .............................. 135/115 X |
| 4,815,784 | 3/1989 | Zheng . |
| 4,825,892 | 5/1989 | Norman . |
| 4,858,634 | 8/1989 | McLeese . |
| 4,951,333 | 8/1990 | Kaiser et al. . |
| 5,038,812 | 8/1991 | Norman . |
| 5,137,044 | 8/1992 | Brady . |
| 5,163,461 | 11/1992 | Ivanovich et al. . |
| 5,249,592 | 10/1993 | Springer et al. . |
| 5,301,705 | 4/1994 | Zheng ................................. 135/125 X |
| 5,337,772 | 8/1994 | Habchi . |
| 5,370,145 | 12/1994 | Wu . |
| 5,385,165 | 1/1995 | Hazinski et al. . |
| 5,439,017 | 8/1995 | Brown . |
| 5,439,018 | 8/1995 | Tsai . |
| 5,452,934 | 9/1995 | Zheng . |
| 5,467,794 | 11/1995 | Zheng . |
| 5,553,908 | 9/1996 | Shink ............................. 160/370.21 X |
| 5,560,385 | 10/1996 | Zheng ..................................... 135/125 |
| 5,575,324 | 11/1996 | Hwang ............................... 160/370.21 |
| 5,601,105 | 2/1997 | Blen et al. . |
| 5,632,318 | 5/1997 | Wang ................................. 160/370.21 |
| 5,645,096 | 7/1997 | Hazinski et al. . |
| 5,676,168 | 10/1997 | Price . |

FOREIGN PATENT DOCUMENTS

| | | |
|---|---|---|
| 2635136 | 8/1988 | France . |
| 2699459 | 6/1994 | France . |
| 3013178 | 11/1981 | Germany . |
| WO9416178 | 7/1994 | WIPO . |

OTHER PUBLICATIONS

Frontgate Summer 1995 Catalog, p. 32.

*Primary Examiner*—Carl D. Friedman
*Assistant Examiner*—Timothy B. Kong
*Attorney, Agent, or Firm*—Raymond Sun

[57] ABSTRACT

Collapsible structures are provided having at least two collapsible flexible loop members, each loop member defining a closed loop and having an upper and a lower edge. Each loop member is capable of assuming an expanded position and a collapsed position. Two adjacent loop members overlap each other at a first overlapping point along the upper edges of the two adjacent loop members, and at a second overlapping point along the lower edges of the two adjacent loop members. The overlapping loop members define a hinge portion about which the two adjacent loop members are pivotable, with the hinge portion positioned vertically with respect to the ground. A fabric is provided for substantially covering each loop member, each loop member substantially supporting the fabric in particular areas so that the fabric assumes the particular configuration of the loop member in its expanded position. The loop members and their associated fabric are foldable on top of each other about their respective hinge portions to have the loop members and their associated fabric overlaying each other, and the overlaying loop members are then collapsible to the collapsed positions by twisting and folding to form a plurality of concentric rings and layers of fabric to substantially reduce the size of the structure in the collapsed position.

15 Claims, 12 Drawing Sheets

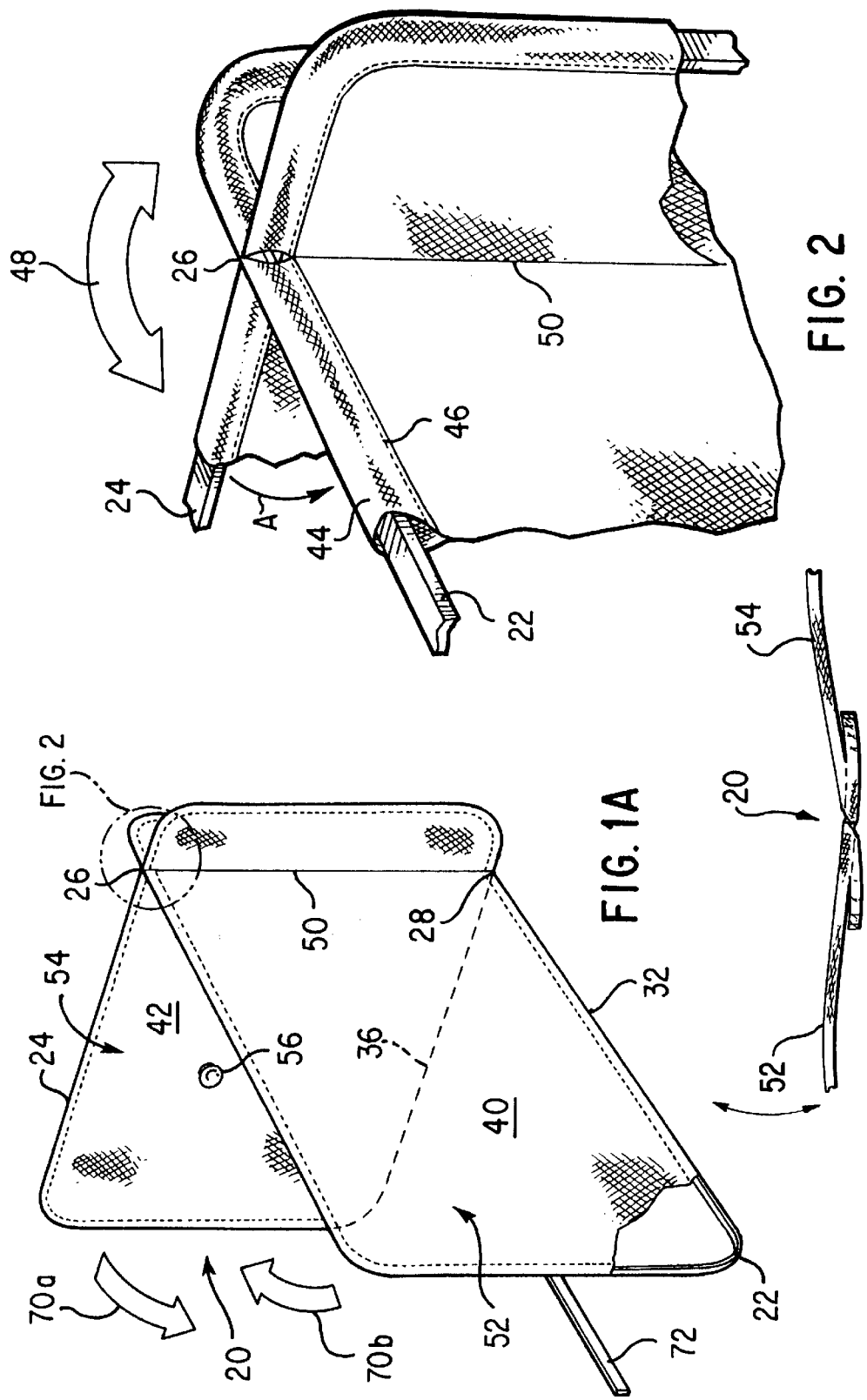

COLLAPSIBLE STRUCTURES HAVING OVERLAPPING SUPPORT LOOPS

TECHNICAL FIELD

The present invention relates to sunshields, partitions and shade structures, and in particular, to collapsible sunshields, partitions and shade structures supported by resilient loop members maintained in overlapping relationship with each other. The sunshields, partitions and shade structures may be twisted and folded to reduce the overall size of the sunshield, partition or shade structure.

BACKGROUND ART

A number of prior art sunshields are well-known for use, for example, in shielding the interior of an automobile from unwanted heat and sunlight. These sunshields may be positioned against an interior window surface, but are typically positioned against the windshield because of the difficulty of retaining these sunshields against the other window surfaces. Examples of these sunshields are illustrated in U.S. Pat. Nos. 4,815,784 to Zheng, 5,024,262 to Huang, and 5,452,934 to Zheng. In each of these sunshields, one or more resilient loop members are used to support the sunshield in an expanded configuration. These sunshields may be twisted and folded to reduce the overall size of the sunshield.

A number of prior art shade or tent structures have also been provided for a wide variety of uses, such as for camping, for shade, or for play by children. Examples of these shade structures are illustrated in U.S. Pat. Nos. 3,990,463 to Norman, 4,825,892 to Norman, 5,038,812 to Norman, and 5,467,794 to Zheng. Each of these shade structures also use one or more resilient loop members to support the structure in an expanded configuration. These shade structures may be twisted and folded to reduce the overall size of the shade structure.

SUMMARY OF THE INVENTION

The present invention provides basic principles which are effective in constructing a wide variety of collapsible structures, such as but not limited to sunshields, partitions and shade structures. These collapsible structures have simple constructions, are easy to use, and provide the user with much variety in use and play.

The collapsible structure according to the present invention comprises at least two collapsible flexible loop members, each loop member defining a closed loop and having an upper and a lower edge. Each loop member is capable of assuming an expanded position and a collapsed position. Two adjacent loop members overlap each other at a first overlapping point along the upper edges of the two adjacent loop members, and at a second overlapping point along the lower edges of the two adjacent loop members. The overlapping loop members define a hinge portion about which the two adjacent loop members are pivotable, with the hinge portion positioned vertically with respect to the ground. A fabric is provided for substantially covering each loop member, each loop member substantially supporting the fabric in particular areas so that the fabric assumes the particular configuration of the loop member in its expanded position. The loop members and their associated fabric are foldable on top of each other about their respective hinge portions to have the loop members and their associated fabric overlaying each other, and the overlaying loop members are then collapsible to the collapsed positions by twisting and folding to form a plurality of concentric rings and layers of fabric to substantially reduce the size of the structure in the collapsed position.

According to one preferred embodiment of the present invention, each hinge portion further includes a stitch line connecting the fabric of the two adjacent loop members and extending from about the first overlapping point to about the second overlapping point. The structure further includes a loop retaining portion provided along the fabric for retaining the loop members.

In one embodiment of the present invention, the first and second overlapping points are provided near the first side edge of the one of the two adjacent loop members and near the second side of the other of the two adjacent loop members. In another embodiment of the present invention, the first and second overlapping points are provided at about the center of the upper and lower edges of the two adjacent loop members.

The collapsible structure according to the present invention may be used as a sunshield, partition or shade structure. When used as a partition or shade structure, the lower edges of the two adjacent loop members rest on the ground when the loop members are in the expanded position. In addition, when used as a shade structure, it would have a roof panel attached to the upper edges of some of the loop members. A floor panel can also be attached to the lower edges of some of the loop members.

The structures according to the present invention are collapsible into smaller structures for convenient transportation and storage. In addition, it is possible to combine a plurality of the structures to provide structures having different sizes and configurations, thereby increasing the variety of use and play.

BRIEF DESCRIPTION OF THE DRAWINGS

FIG. 1A is a perspective view of a sunshield according to a first embodiment of the present invention illustrated in an expanded configuration;

FIG. 1B is a top plan view of the sunshield of FIG. 1A;

FIG. 2 is a perspective cut-away sectional view of the sunshield of FIG. 1A taken along section 2—2 thereof;

BEST MODES FOR CARRYING OUT THE INVENTION

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The principles of the present invention are applicable to sunshields, partition structures and shade structures, and shall be described herein in connection with such structures. However, it will be appreciated by those skilled in the art that the principles of the present invention are not so limited and can be applied to other structures for many different uses.

Figure 3:
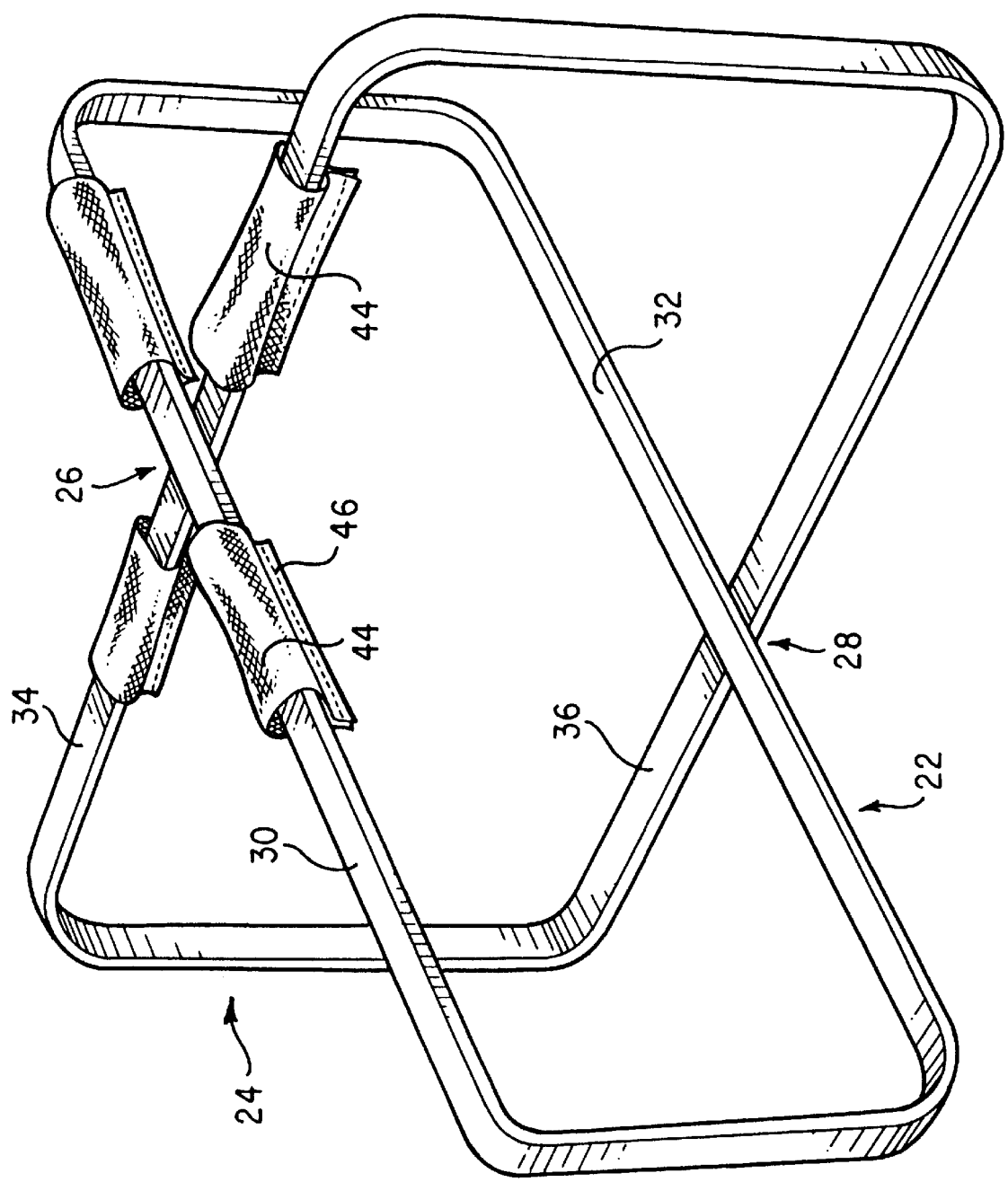
FIG. 3 is a perspective view of the resilient loop members that can be used to support the sunshield of FIG. 1A.

FIGS. 1–3 illustrate a structure 20 according to a first embodiment of the present invention, which may be used as a sunshield. The sunshield 20 is formed by two resilient loop members 22 and 24 that together define the outer boundary of the sunshield 20. Referring to FIG. 3, each loop member 22 and 24 is provided as a closed resilient loop, either as a closed continuous loop or as a strip of material with both ends held together by a retaining connector or other conventional attachment mechanism to form a closed loop. The resilient loop members 22 and 24 are preferably made from a relatively strong springy material which is flexible enough to allow it to be coiled. The preferred material for the loop members 22 and 24 includes flat spring steel stock, and in particular, stainless steel, although plastic may also be used. Each closed loop member 22 and 24 is preferably substantially equal in size and symmetrically disposed, but it will be appreciated by those skilled in the art that the resilient loop members 22 and 24 may assume any variety of shapes and sizes, including but not limited to circular or oval. Both resilient loop members 22 and 24 can even be provided in different sizes.

As illustrated in FIGS. 1–3, the two loop members 22 and 24 are fitted within each other, and overlap or cross-over each other at overlapping points 26 and 28. The overlapping point 26 is defined by the intersection or crossing of the upper edges 30 and 34 of loop members 22 and 24, respectively, and the overlapping point 28 is defined by the intersection or crossing of the lower edges 32 and 36 of loop members 22 and 24, respectively. The overlapping points 26 and 28 can be positioned anywhere along the upper edge 30 or lower edge 32 of the loop member 22, and anywhere along the upper edge 34 or lower edge 36 of the loop member 24. FIG. 1A illustrates the overlapping points 26 and 28 provided near the adjacent side edges of the two loop members 22 and 24. The two overlapping loop members 22 and 24 are pivotable about their overlapping points 26 and 28 between two positions, a first completely open position (see FIG. 1B) in which both loop members 22 and 24 lie flat in the same plane and extend to the widest longitudinal length of the sunshield 22, and a second folded position in which the loop members 22 and 24 are folded towards each other (such as in the direction of arrows 70a and 70b in FIG. 1) to overlie each other. The sunshield 20 is normally deployed at the windshield of an automobile when in the first completely open position, and the sunshield 20 is deployed to the second folded position as a first step towards folding and collapsing the sunshield 20 into a smaller size, as described in greater detail hereinbelow.

Each loop member 22 and 24 is retained in a loop retaining portion of one or more fabric pieces. Two fabric pieces 40 and 42 are provided, one for each loop member 22 and 24, respectively. At least one of the fabric pieces 40 or 42 may be provided as two separate pieces or portions of fabric. Each fabric piece 40 and 42 completely covers, and forms a panel 52 or 54 within, the respective loop member 22 or 24, and is preferably held in tension with the loop member 22 or 24. One side of each fabric 40, 42 may used as the window-facing side of the sunshield.

The fabric pieces 40 and 42 are preferably made from a sheet material which is effective in reflecting and blocking light and heat from entering the interior of the automobile, and may be made from sheet fabric, woven fabric, PVC, metal foil, and even films. A layer of metallized fabric or other reflective material may be added to the window-facing sides of the fabric 40, 42 to further aid in reflecting and blocking light and heat. A less expensive, though less effective, alternative is to choose a white fabric as the reflective surface. In addition, the window-facing sides may be provided with a different color so that the user can easily recognize it.

The loop retaining portions are preferably provided in the form of a sleeve for retaining the loop members 22 and 24. The loop members 22 and 24 may be retained at the loop retaining portions by a number of different methods. In a first preferred method, which is illustrated in FIGS. 1–3, a sleeve 44 may be formed by folding a peripheral edge of the fabric 40 or 42 over the loop member 22 or 24 and then applying a stitching (such as designated by numeral 46), or by providing a separately-formed tubular sleeve that is stitched along the same stitch line 46 to the fabric 40, 42. Under this first method, the loop members 22 and 24 may be left free and unsecured within the sleeves 44. In a second preferred method, the loop members 22 and 24 may be mechanically fastened, glued or fused to the sleeve 44 or the fabric 40, 42. Other conventional methods may be used without departing from the spirit and scope of the present invention.

The loop members 22 and 24 should not be connected or attached at the overlapping points 26 and 28 so as to allow the loop members 22 and 24 to pivot about these points. The structure of the sleeve 44 at the overlapping points 26 and 28 can be provided in one of several ways. In a first alternative illustrated in an exaggerated sense in FIG. 3, a small portion of the sleeves 44 for both loop members 22 and 24 may be interrupted or disconnected adjacent the overlapping points 26 and 28 so as to expose the loop members 22 and 24 at these overlapping points 26 and 28. As a second alternative, the sleeves 44 for both panels 52 and 54 can be connected to each other to form a "+" or cross-shaped sleeve portion at the overlapping points 26 and 28 (see FIG. 2). As a third example, the respective sleeves 44 for both panels 52 and 54 can run uninterrupted throughout the closed loop of the loop members 22 and 24. Thus, the loop members 22 and 24 pivot about the overlapping points 26 and 28 in the two directions illustrated by arrow 48 in FIG. 2, with the overlapping points 26 and 28 together acting as a hinge mechanism when the loop members 22 and 24 are pivoted about these points 26 and 28 at the same time. To better define the overall hinge mechanism created by the overlapping portions 26 and 28, this hinge mechanism may optionally include a stitch line 50 along which the two fabric pieces 40 and 42 are stitched together. The stitch line 50 extends from one overlapping point 26 to the other overlapping point 28, and assists in maintaining the loop members 22 and 24 at about the same overlapping points 26 and 28 even though the loop members 22 and 24 are not connected or attached to each other. Thus, the two side panels 52 and 54 defined by the loop members 22 and 24, respectively, may also be hinged and pivoted about the stitch or pivot line 50.

It will also be appreciated that the loop retaining portion or sleeve 44 can be provided either at the periphery of the fabric 40 and 42, as shown in FIGS. 1–3, or at a portion of the fabric 40 and 42 interior from the periphery. The only requirement is that the loop members 22 and 24 be positioned so that they can sufficiently support the sunshield 20 to effectively cover the automobile window or sunshield.

It will be appreciated that suction cups 56 can be optionally positioned anywhere on the window-facing sides of the fabric 40 and 42. Further, it will be appreciated by those skilled in the art that other conventional attachment devices, such as snaps or VELCRO™, may be used in place of the suction cups 56 without departing from the spirit and scope of the present invention.

Figure 4:
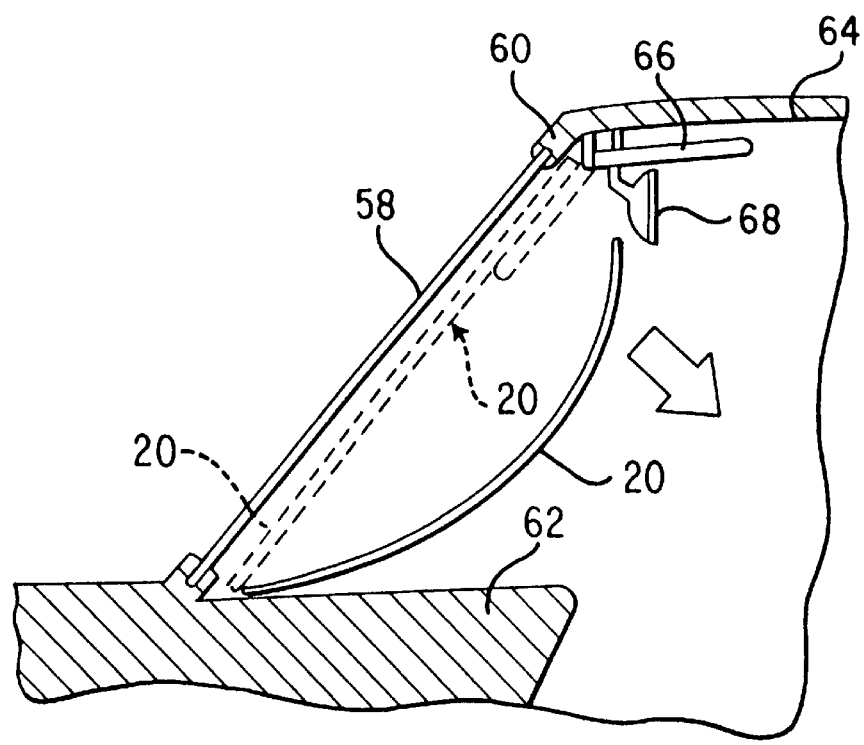
FIG. 4 is a side elevational view of the sunshield of FIG. 1A positioned behind an automobile windshield.

FIG. 4 illustrates the sunshield 20 in position against a windshield 58. Although the operation of the sunshield 20 is shown in connection with a windshield, it is understood that the sunshield 20 can also be used effectively in the same manner with side and rear windows. The windshield 58 is held in position by a frame 60 and the sunshield 20 is positioned between a dashboard 62 and a ceiling 64 of the automobile. Visors 66 and the rear view mirror 68 may be used to provide support for the sunshield 20 against the windshield 58, although it is understood that the visors 66 are not necessary if the suction cups 56 are used. In most cases, suction cups 56 alone are sufficient for retaining the sunshield 20 against the windshield 58 or any side window or rear window where there are no overhanging visors. However, when used to cover a windshield 58, the visors 66 may also be flipped down to assist in retaining the sunshield 20 against the windshield 58. When the sunshield 20 is to be stored, the sunshield 20 can be easily removed from the windshield 58 by pulling the suction cups 56 from the windshield 58. These suction cups 56 can also be removably attached to the fabric pieces 40 and 42 so that worn-out or defective suction cups 56 can be replaced after a period of use.

The shape of the loop members 22 and 24, and of the resulting sunshield 20, is not important as long as they are sized and shaped so that they sufficiently support the sunshield 20 to effectively cover the entire windshield 58. Any shape may be used, and a few examples are illustrated in my previous U.S. Pat. No. 4,815,784 to Zheng, the entire disclosure of which is incorporated by this reference as though fully set forth herein. For example, the loop members 22 and 24 may be circular, oval, truncated circular, truncated oval, substantially rectangular, or any other variety of shapes.

Figure 5A:
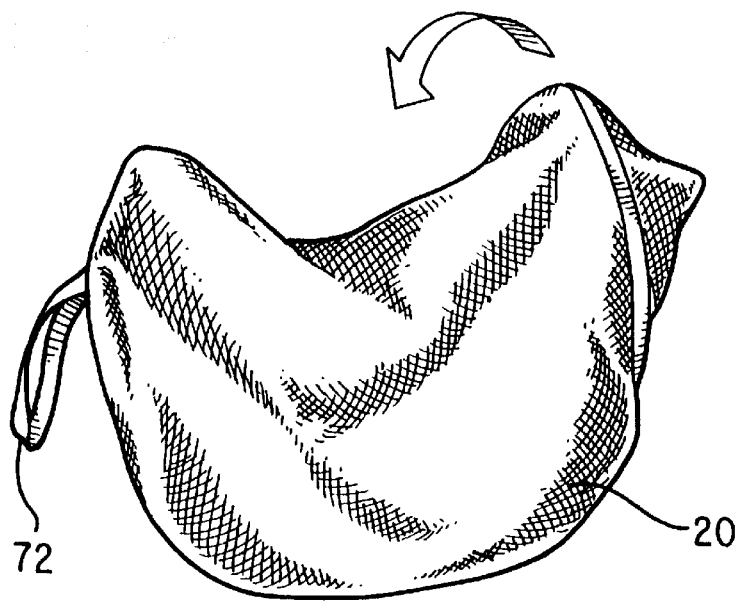
FIGS. 5A through 5E illustrate how the sunshield of FIG. 1A may be twisted and folded for compact storage.
Figure 5B:
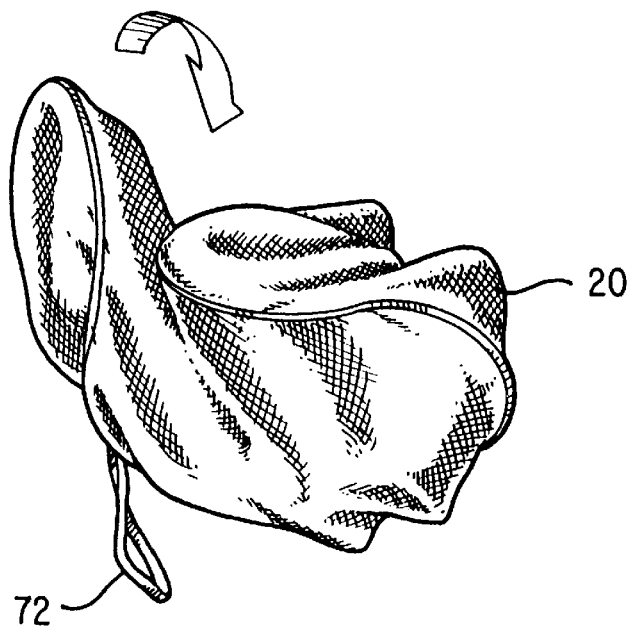
Figure 5C:
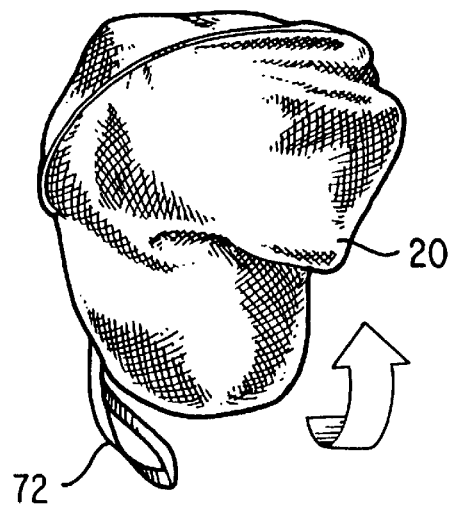
Figure 5D:
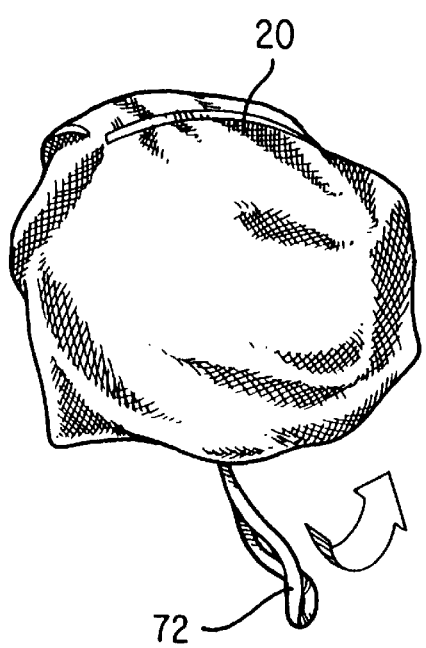

FIGS. 5(A) through 5(E) describe the various steps for folding and collapsing the structure 20 of FIG. 1 for storage. The first step consists of folding the two loop members 22 and 24 toward each other (as shown by arrows 70a and 70b in FIG. 1) about the hinge mechanism of the overlapping points 26 and 28, and the optional stitch line 50. When the two loop members 22 and 24 are folded together, the second step, shown in FIG. 5A, is to twist and fold the combined structure to initially collapse the loop members and fabric into a smaller diameter. As shown in FIG. 5B, the third step is to fold in the opposite side of the combined structure upon the previous fold to further collapse the combined loop members. As shown in FIG. 5C, the fourth step is to continue the collapsing so that the size of the structure is a fraction of the diameter of the initial structure. FIG. 5D shows the fifth step with the loop members 22, 24 and fabric panels 52, 54 collapsed on each other to provide for a small essentially compact configuration having a plurality of concentric closed loop rings and layers of fabric so that the collapsed structure has a size which is a fraction of the original size of the structure.

Figure 5E:
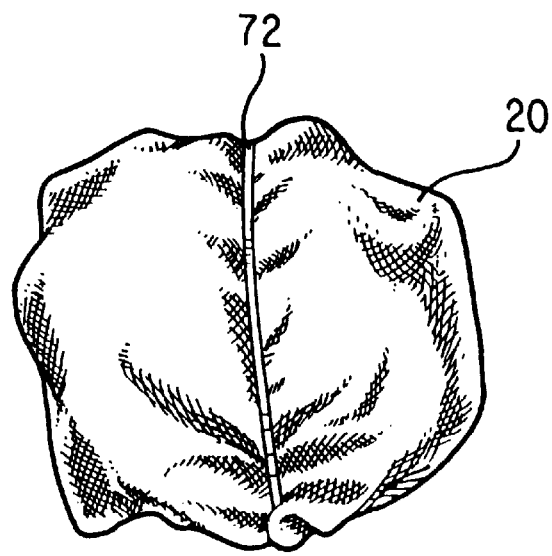

In addition, referring to FIGS. 1 and 5E, a retaining member 72 may be attached to one end of the sunshield 20, and may be used to tie or hold the collapsed sunshield 20 in the collapsed position. Alternatively, a bag (not shown) may be used to store the collapsed sunshield 20.

Figure 5F:
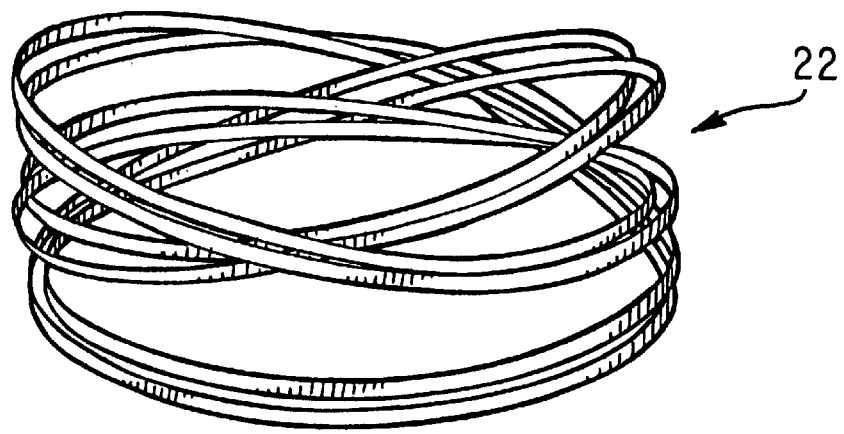
FIG. 5F illustrates the resilient loop members of FIG. 3 in a folded position illustrating how the loop members are folded to provide for two sets of three loop portions to thereby substantially reduce the size thereof.

FIG. 5(F) illustrates loop members 22 and 24 in the collapsed position. The structure of each loop member 22 and 24 essentially consists of two sets of three loop rings intertwined to lie flat. In the collapsed position, the structure would have a diameter of less than twelve inches, which makes it easy to store the sunshield inside an automobile.

Although the structure 20 is illustrated as being a sunshield 20, the same structure can be provided in larger sizes and used as a partition or for other uses. For example, the structure 20, as shown in FIG. 1 with the lower edges 32 and 36 of the loop members 22 and 24, respectively, resting on a flat surface, such as the ground, can be used as a partition. The panels 52 and 54 would act as the walls of the partition, with the interconnecting hinge mechanism acting as a pivotable corner of the partition. This interconnecting hinge mechanism would be disposed substantially vertically, or perpendicular to the ground. When used as a partition, the size and configuration of the loop members 22 and 24, and therefore the panels 52 and 54, respectively, are not limited to the size and shape of a windshield and can therefore be varied. In addition, the overlapping points 26 and 28 can be positioned along different parts of the upper and lower edges 30, 32, 34 and 36 of the loop members 22 and 24. These variations and modifications can be made to suit the user's needs. As a non-limiting example, a substantially "+" or cross-shaped partition can be defined by positioning the overlapping points 26 and 28 at substantially the centers of the upper and lower edges 30, 32, 34 and 36 of the loop members 22 and 24, or at points between the center and the side edges of the upper and lower edges 30, 32, 34 and 36, as shown in FIG. 3. This will provide a partition which defines four separate non-enclosed spaces. In addition, the angle A (see FIG. 2) between the panels 52 and 54 can be varied between 1 degree and 180 degrees to vary the configuration of the partition and the size of the space defined between the panels 52 and 54. Other alternatives can be provided and modifications made without departing from the spirit and scope of the present invention.

Partitions and sunshields having more than two loop members and panels can also be provided according to the present invention. Referring to a second preferred embodiment of the present invention illustrated in FIG. 6, a partition or sunshield 100 has three separate panels 102, 104 and 106, each defined by a loop member (not shown) and having the same construction as panels 52 and 54 and loop members 22 and 24 described above. Panels 102 and 104 are interconnected at the overlapping points 108, 110 and stitch line 112 by overlapping their respective loop members in the manner described above. Similarly, panels 104 and 106 are interconnected at the overlapping points 114, 116 and stitch line 118 by overlapping their respective loop members, also in the manner described above.

Figure 6:
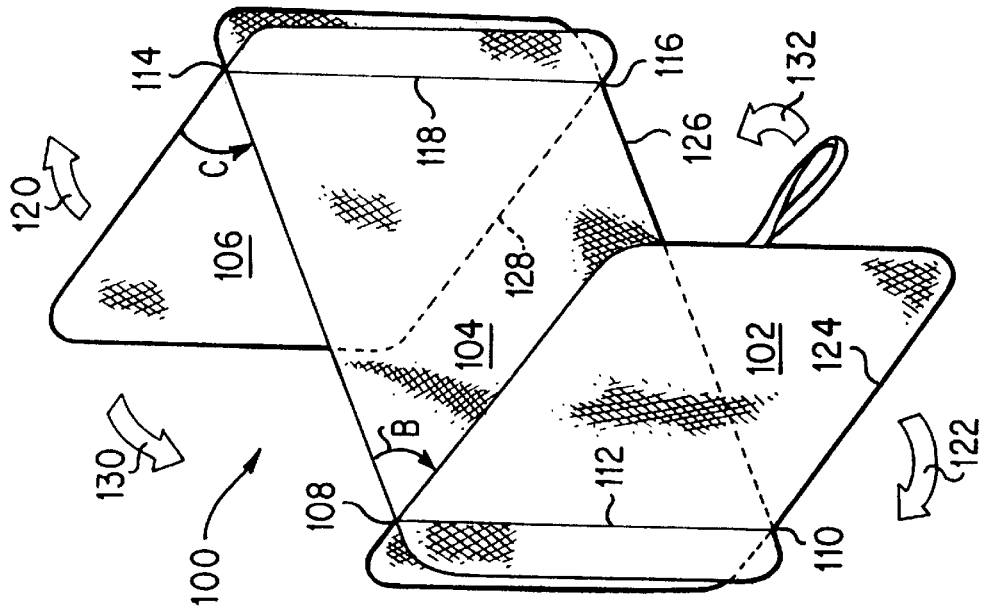
FIG. 6 is a perspective view of a structure according to a second embodiment of the present invention illustrated in an expanded configuration.

FIG. 6 shows the structure 100 in use as a partition, with the lower edges 124, 126 and 128 of the panels 102, 104 and 106, respectively, resting on the ground, and the interconnecting hinge mechanisms (i.e., the optional stitch line 112 and the overlapping points 108 and 110, and the optional stitch line 118 and the overlapping points 114 and 116) disposed vertically. The angle B between the panels 102 and 104, and the angle C between the panels 104 and 106, can be varied by pivoting the interconnecting hinge mechanisms. When the structure 100 is to be used as a sunshield, the panels 106 and 102 are folded in the directions indicated by arrows 120 and 122, respectively, so that the three panels 102, 104 and 106 lie flat in the same plane. To fold and collapse the three panels 102, 104 and 106, the panels 106 and 102 are folded toward the panel 104 in the directions indicated by arrows 130 and 132, respectively, so that the three panels 102, 104 and 106 overlie each other to form one stack of panels. The folding and collapsing steps illustrated in FIGS. 5A–5E can be used to fold and collapse the structure 100 into a size which is a fraction of the original size of the structure.

Figure 7:
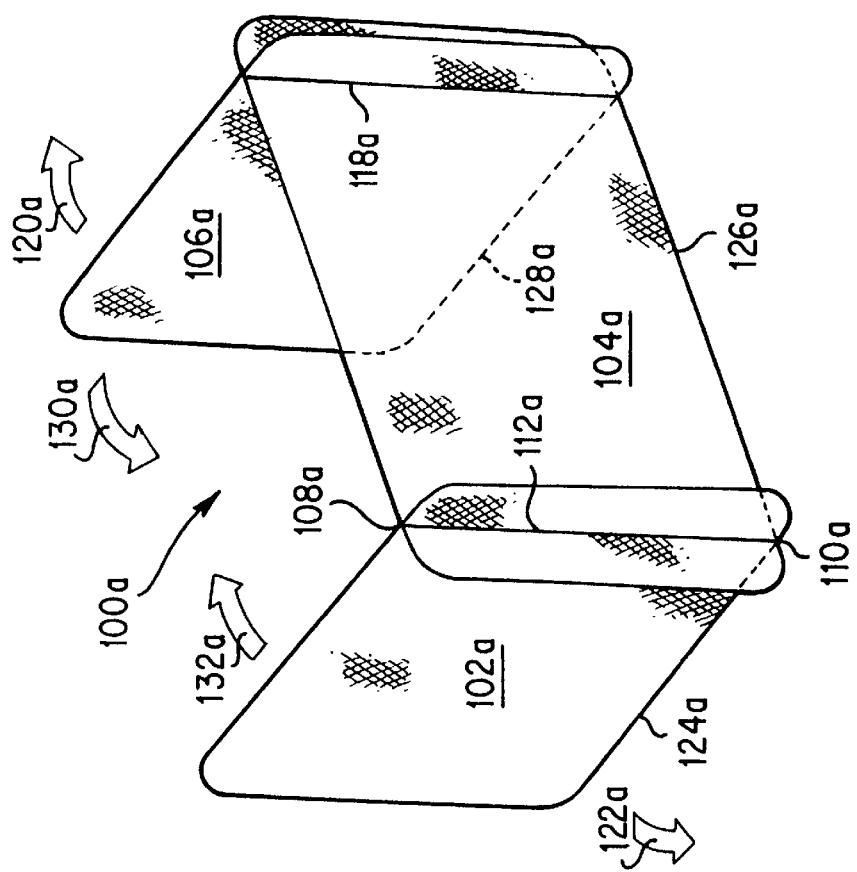
FIG. 7 is a perspective view of a structure according to a third embodiment of the present invention illustrated in an expanded configuration.

The third preferred embodiment of the present invention illustrated in FIG. 7 is a modification 100a of the partition or sunshield 100 of FIG. 6. The structure 100a is essentially the same as the structure 100, except that the panels 102a and 104a are interconnected at overlapping points 108a, 110a and stitch line 112a which are at a different position along the edge 124a of panel 102a. FIG. 7 shows the structure 100a in use as a partition, with the lower edges 124a, 126a and 128a of the panels 102a, 104a and 106a, respectively, resting on the ground, and the interconnecting hinge mechanisms disposed vertically. When the structure 100a is to be used as a sunshield, the panels 106a and 102a are folded in the directions indicated by arrows 120a and 122a, respectively, so that the three panels 102a, 104a and 106a lie flat in the same plane. To fold and collapse the three panels 102a, 104a and 106a, the panels 106a and 102a are folded toward the panel 104a in the directions indicated by arrows 130a and 132a, respectively, so that the three panels 102a, 104a and 106a overlie each other to form one stack of panels. The folding and collapsing steps illustrated in FIGS. 5A–5E can be used to fold and collapse the structure 100a into a size which is a fraction of the original size of the structure.

Figure 8:
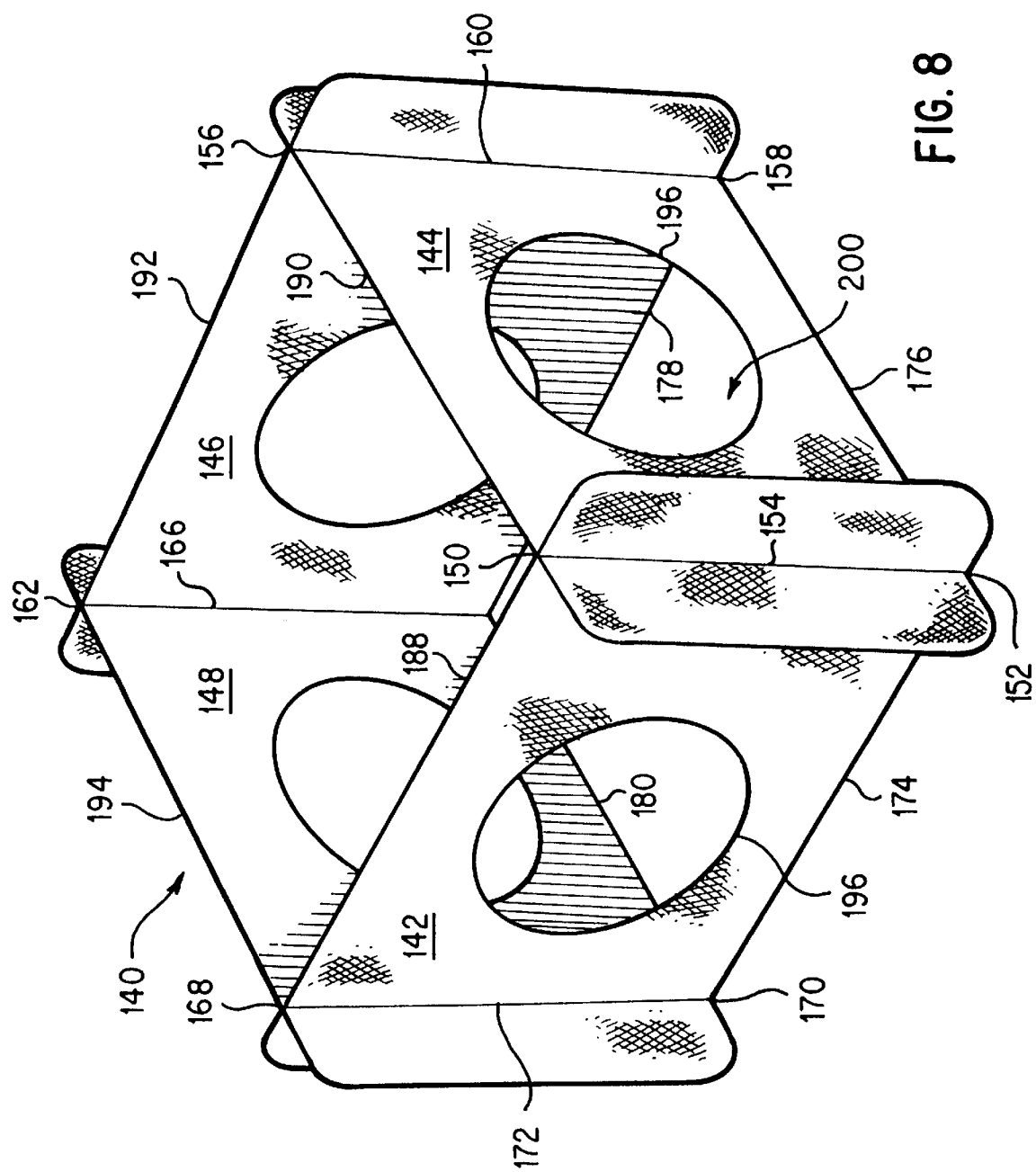
FIG. 8 is a perspective view of a structure according to a fourth embodiment of the present invention illustrated in an expanded configuration.

The fourth preferred embodiment of the present invention is illustrated in FIG. 8. A structure 140 has four separate panels 142, 144, 146 and 148, each defined by a loop member (not shown) and having the same construction as panels 52 and 54 and loop members 22 and 24 described above. Panels 142 and 144 are interconnected at the overlapping points 150, 152 and stitch line 154 by overlapping their respective loop members in the manner described above. Similarly, panels 144 and 146 are interconnected at the overlapping points 156, 158 and stitch line 160, panels 146 and 148 are interconnected at the overlapping point 162 and stitch line 166, and panels 142 and 148 are interconnected at the overlapping points 168, 170 and stitch line 172. FIG. 8 shows the structure 140 in use as a partition, with the lower edges 174, 176, 178 and 180 of the panels 142, 144, 146 and 148, respectively, resting on the ground, and the four interconnecting hinge mechanisms disposed vertically. The angles between adjacent panels of the partition 140 can be varied by pivoting the interconnecting hinge mechanisms.

Figure 9A:
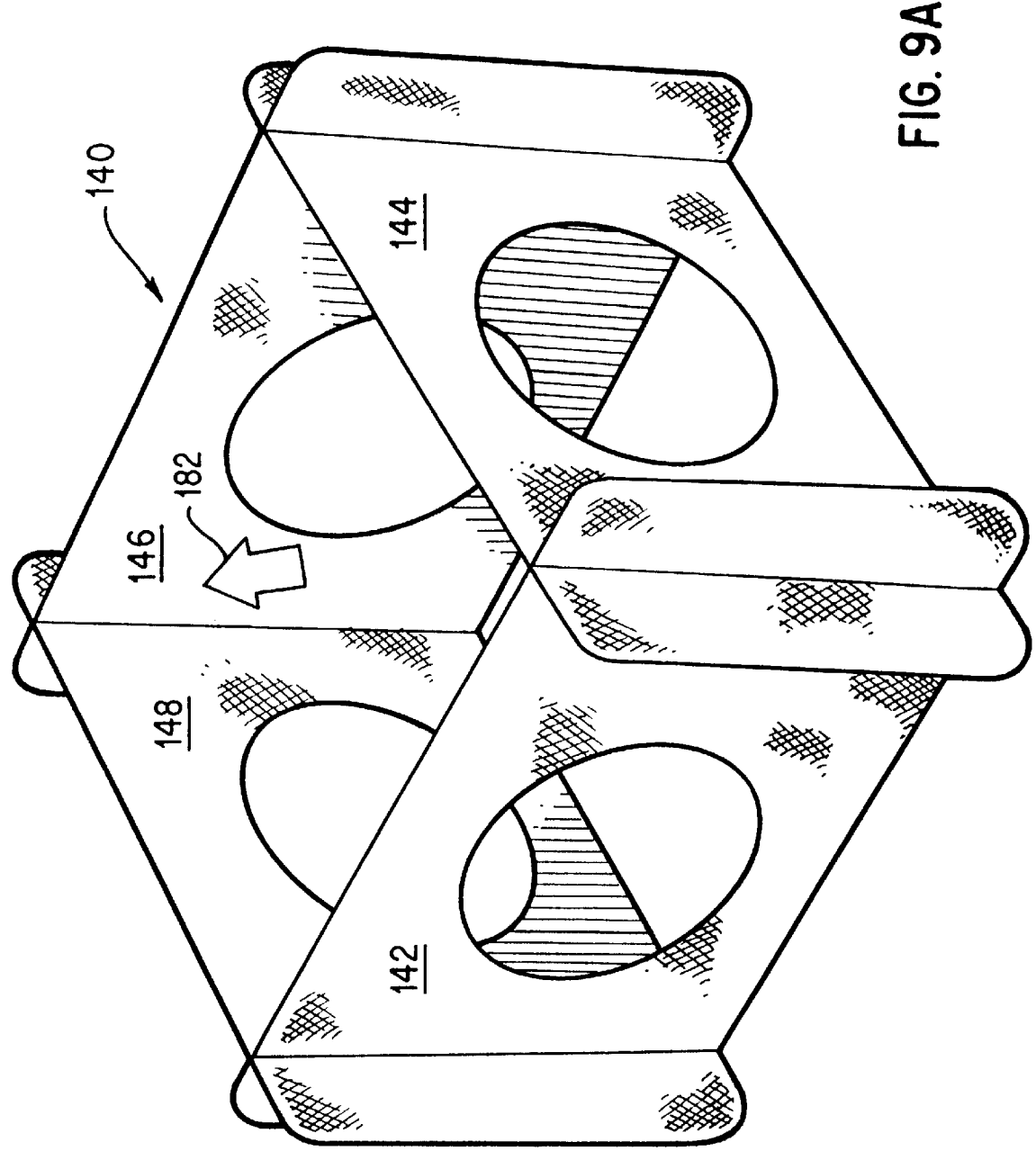
FIGS. 9A–9C illustrate how the different panels of the structure of FIG. 8 may be folded upon each other prior to twisting and folding for compact storage.
Figure 9B:
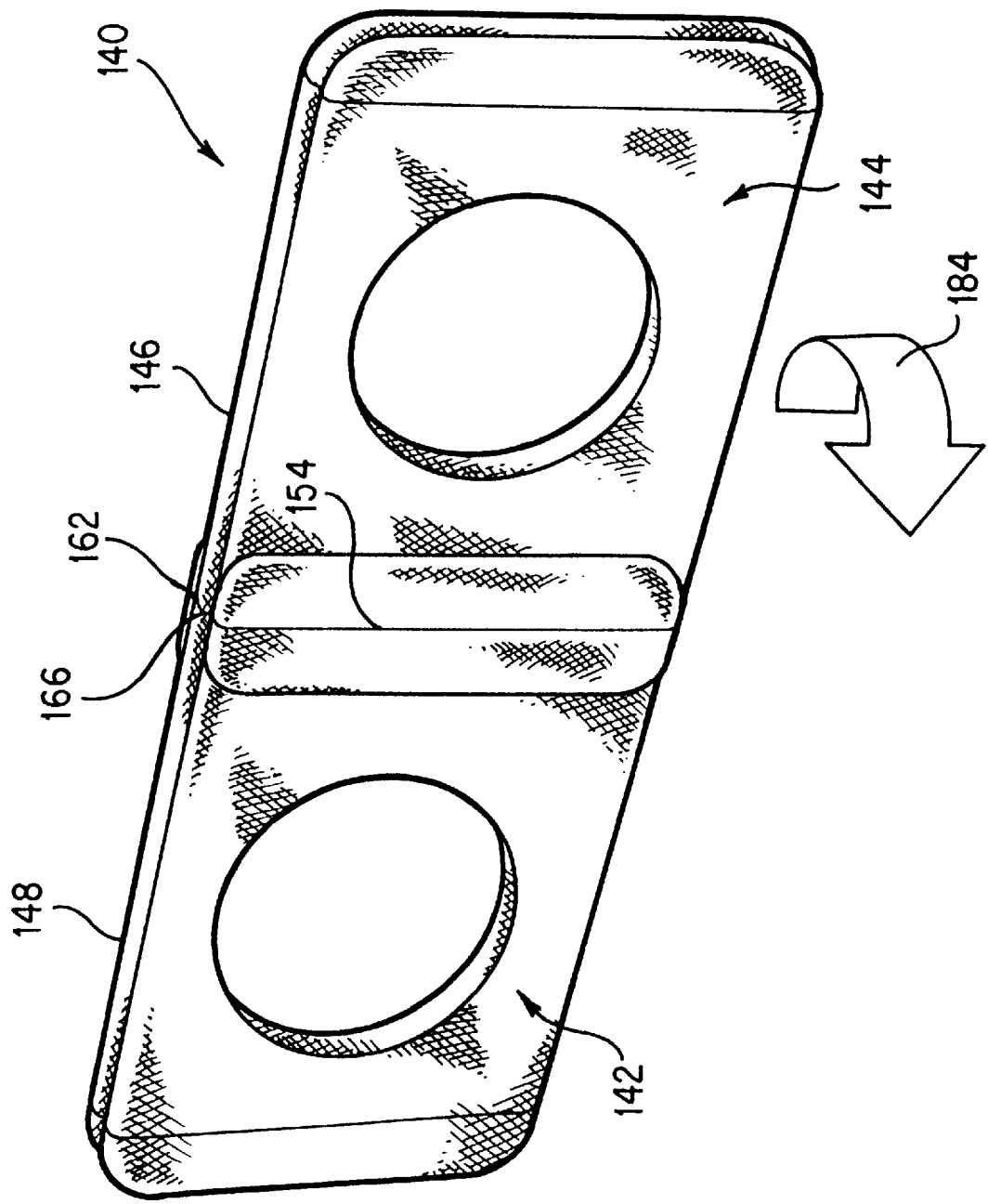
Figure 9C:
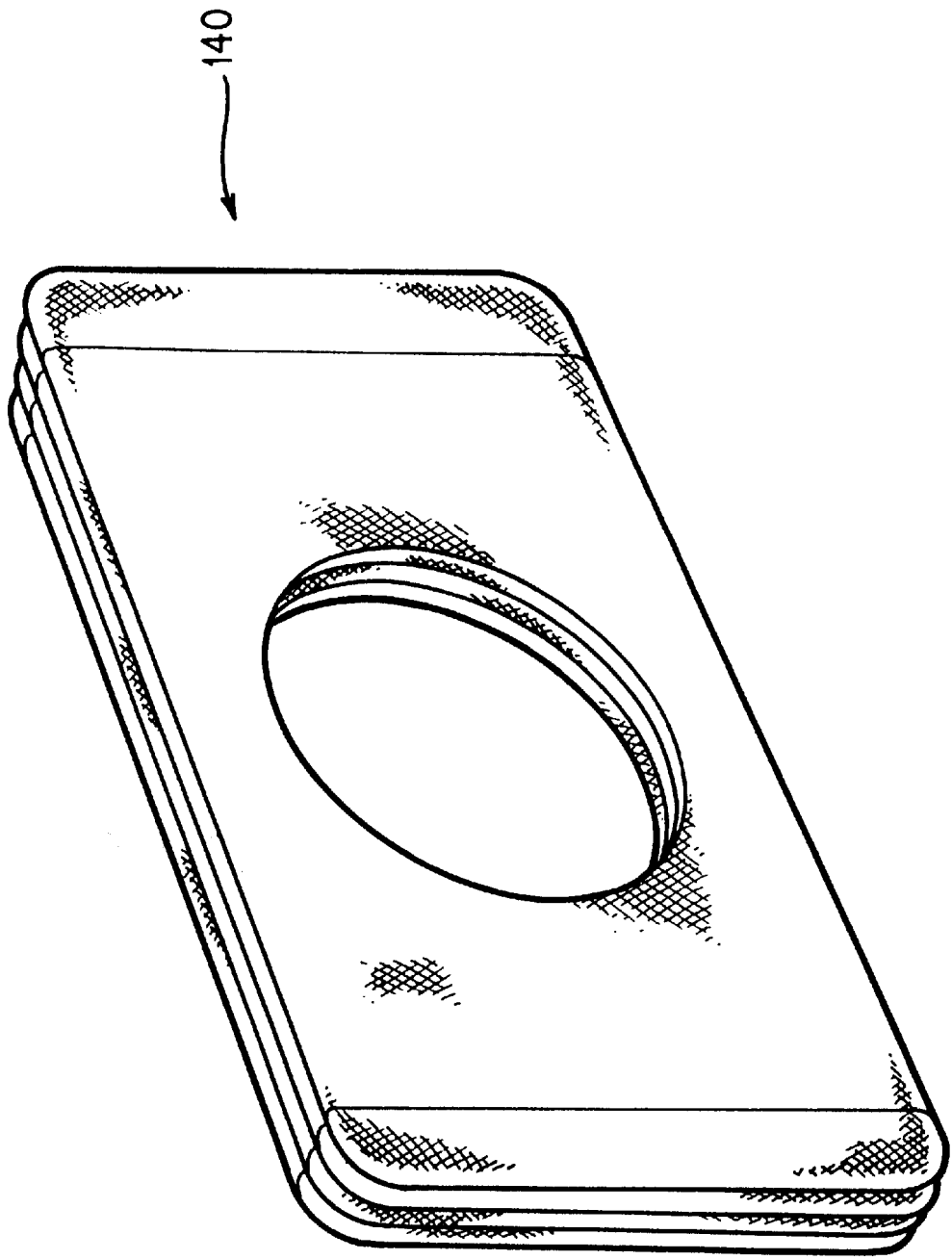

To fold and collapse the four panels 142, 144, 146 and 148, panels 142 and 144 are pushed against panels 148 and 146, respectively, in the direction of arrow 182 shown in FIG. 9A so that the four panels 142, 144, 146 and 148 take the configuration shown in FIG. 9B, with panels 142 and 148 overlying each other and panels 144 and 146 overlying each other. During this first pushing step, the respective interconnecting hinge mechanisms (which include the optional hinge stitches 154, 160, 166 and 172 and their respective overlapping points) are pivoted. One pair of overlaying panels 142, 148 or 144, 146 is then folded over the interconnecting hinge mechanisms defined in part by hinge stitches 154 and 166 in the direction of arrow 184 in FIG. 9B, so that the four panels 142, 144, 146 and 148 overlie each other to form one stack of panels as shown in FIG. 9C. The folding and collapsing steps illustrated in FIGS. 5A–5E can be used to fold and collapse the structure 140 into a size which is a fraction of the original size of the structure.

Figure 11:
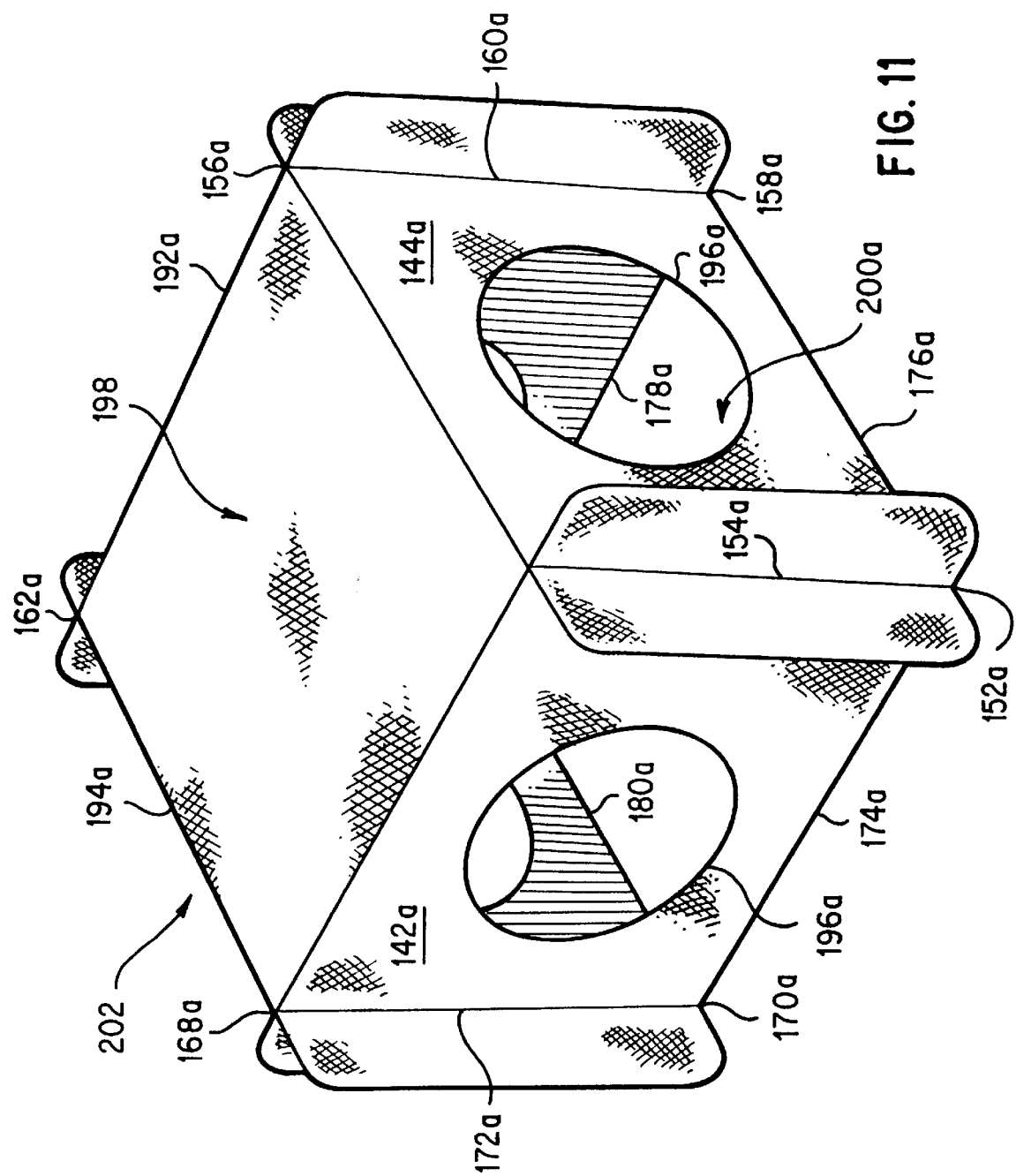
FIG. 11 is a perspective view of a structure according to a sixth embodiment of the present invention illustrated in an expanded configuration, which represents a modification to the structure of FIG. 8.

The partition 140 can also be provided with a roof 198 (shown in FIG. 11) so that it can be used as a collapsible shade structure or tent 202. For example, a fabric panel can be stitched or otherwise connected by known methods to the upper edges 188, 190, 192 and 194 of the panels 142, 144, 146 and 148, respectively, so that the four panels 142, 144, 146 and 148 and the fabric roof 198 define an enclosed interior space. Openings 196 can be provided in one or more of the panels 142, 144, 146 and 148 to provide ingress and egress. In addition, another fabric or other material can be stitched or otherwise connected by known methods to the lower edges 174, 176, 178 and 180 of the panels 142, 144, 146 and 148, respectively, to define a floor 200 for the shade structure. The shade structure 202 is folded and collapsed in the same manner described above for partition 140. Even though the structure 140 is shown as having four panels 142, 144, 146 and 148, it is possible to provide the structure 140 (used as a partition, shade structure, or other use) with three panels interconnected to each other according to the principles of the present invention.

Figure 10:
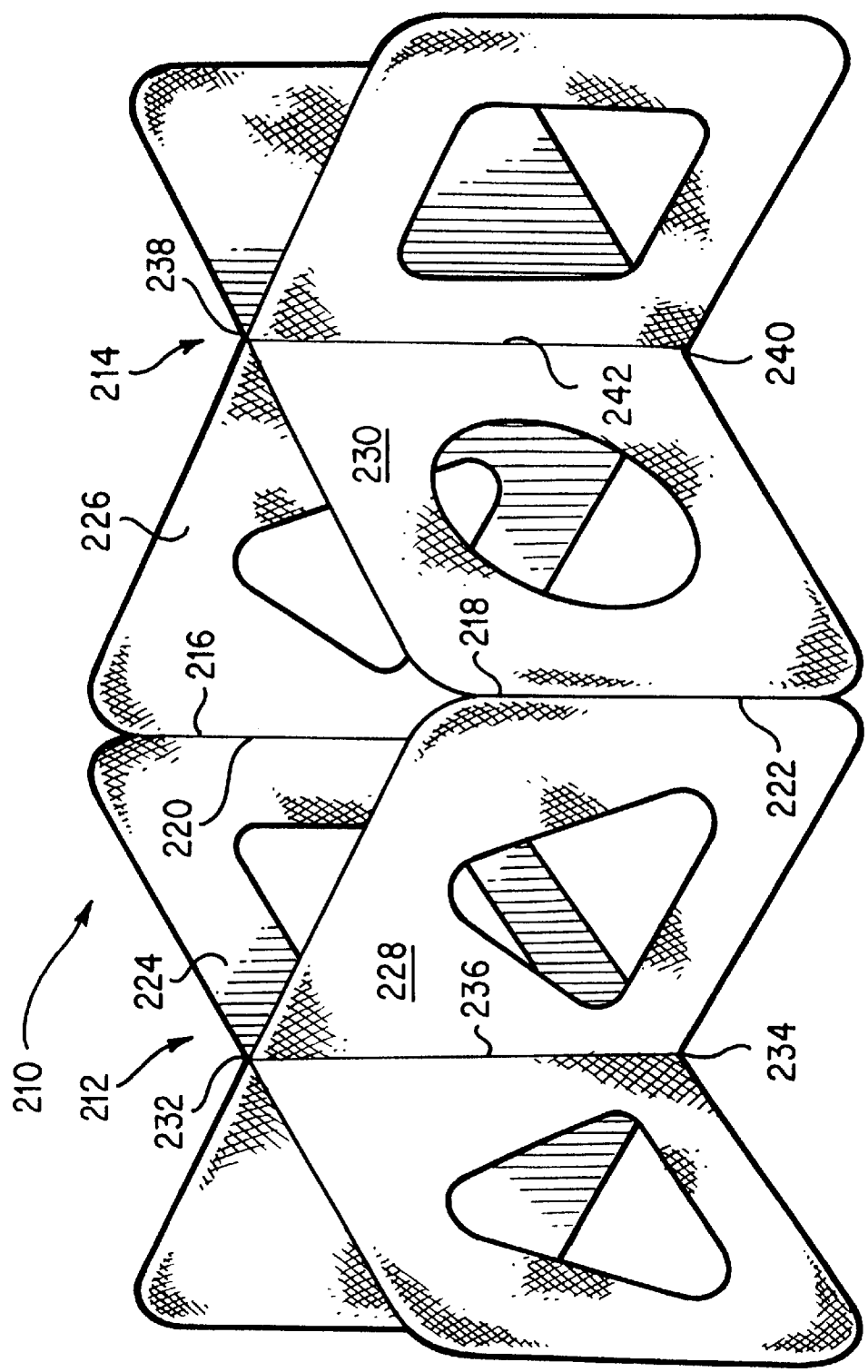
FIG. 10 is a perspective view of a structure according to a fifth embodiment of the present invention illustrated in an expanded configuration.

In addition, it is possible to combine a plurality of the structures to provide structures with different sizes and configurations, thereby increasing the variety of use and play. As a non-limiting example, FIG. 10 illustrates a structure 210 that is made up of two separate substantially "+" or cross-shaped structures 212 and 214 connected to each other along adjacent side edges 216 and 220 of panels 226 and 224, respectively, and adjacent side edges 218 and 222 of panels 230 and 228, respectively. The connection along the side edges may be made permanent by applying stitching, or may be made detachable by using conventional detachable attachment devices, such as snaps, hooks or VELCRO™. Each structure 212 and 214 has two separate panels 224, 228 and 226, 230 respectively, each connected by one interconnecting hinge mechanism which includes the overlapping points 232, 234, 238 and 240 and the optional hinge stitches 236 and 242, according to the principles described hereinabove. The overall structure 210 may be a partition structure having one enclosed space and a plurality of other non-enclosed spaces. Alternatively, fabric roofs may be stitched or otherwise connected to all portions, or certain specific portions, of the structures 212 and 214 to provide either a full or a partial shade structure.

As illustrated in the non-limiting embodiments and examples above, the principles of the present invention can be applied to a large variety of objects, including but not limited to sunshields, partitions and shade structures (which include tents). These structures can also be used as play structures (partitions, tents, shade structures, etc.) for children and infants. For example, the partition 140 or shade structure 140 (with roof), and structure 210, described above can be used by a child for play. When used as partitions and shade structures, the fabric is preferably made from strong, lightweight materials and may include woven fabrics, sheet fabrics or even films. The fabric should be water-resistant and durable to withstand the wear and tear associated with rough treatment by children. The loop members can be made from the same materials described above for loop members 22 and 24.

All the structures according to the present invention are collapsible into smaller structures for convenient transportation and storage. In addition, it is possible to combine a plurality of the structures to provide structures having different sizes and configurations, thereby increasing the variety of use and play. Each of the structures according to the present invention are defined by adjacent panels connected by overlapping or crossing loop members encased in these panels. Each pair of adjacent overlapping loop members define a vertical interconnecting hinge between the two adjacent panels about which these panels may be pivoted.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A collapsible sunshield comprising:

two collapsible flexible loop members, each loop member defining a closed loop and comprising opposite first and second edges, each loop member further having an expanded position and a collapsed position, the two loop members crossing each other at a first overlapping point along the first edges of the two loop members, and at a second overlapping point along the second edges of the two loop members, the crossing loop members defining a hinge portion about which the two loop members are pivotable;

one or more fabric covering at least a portion of each loop member, each loop member supporting the fabric so that the one or more fabric of that loop member is held taut and assumes the particular configuration of the loop member in the expanded position of the loop member, with the one or more fabric of each loop member crossing each other adjacent the overlapping points; and the two loop members being foldable on top of each other about the hinge portion to have the loop members overlaying each other and with the overlaying loop members collapsible to the collapsed positions by twisting and folding to form a plurality of concentric rings to substantially reduce the size of the sunshield in the collapsed position.

2. The sunshield of claim 1, wherein the hinge portion further comprises a stitch line connecting the fabric of the two loop members and extending from about the first overlapping point to about the second overlapping point.

3. The sunshield of claim 2, further comprising a window facing side of the fabric and at least one attachment device provided on the window-facing side.

4. The sunshield of claim 3, wherein the at least one attachment device comprises at least one suction cup.

5. The sunshield of claim 2, further comprising a window facing side of the fabric and a layer of reflective material provided on the window-facing side.

6. The sunshield of claim 1, wherein the sunshield further comprises a loop retaining portion provided along the fabric and retaining the loop members.

7. The sunshield of claim 1:

wherein the structure has an open configuration with the loop members lying generally parallel to each other, and a closed position with the loop members overlaying each other, and wherein the overlapping points divide each loop member and the one or more fabric of that loop member into first and second panel portions that are disposed on opposite sides of the overlapping points, with the first and second panel portions of one loop member being disposed at an angle with respect to the first and second panel portions of the other loop member when the loop members are pivoted in any position other than the open and closed configurations.

8. A collapsible structure adapted to be rested on the ground when fully deployed, the structure comprising:

at least two collapsible flexible loop members, each loop member defining a closed loop and comprising opposite first and second edges, each loop member further having an expanded position and a collapsed position, with two adjacent loop members crossing each other at a first overlapping point along the first edges of the two adjacent loop members, and at a second overlapping point along the second edges of the two adjacent loop members, the crossing loop members defining a hinge portion about which the two adjacent loop members are pivotable;

one or more fabric covering at least a portion of each loop member, each loop member substantially supporting the one or more fabric so that the one or more fabric of that loop member is held taut and assumes the particular configuration of the loop member in the expanded position of the loop member, with the fabric of each loop member crossing each other adjacent the overlapping points; and wherein the loop members are foldable on top of each other about their respective hinge portions to have the loop members overlaying each other, and wherein the overlaying loop members are collapsible to the collapsed positions by twisting and folding to form a plurality of concentric rings and to substantially reduce the size of the structure in the collapsed position.

9. The structure of claim 8, wherein each hinge portion further comprises a stitch line connecting the fabric of the two adjacent loop members and extending from about the first overlapping point to about the second overlapping point.

10. The structure of claim 8, wherein the structure further comprises a loop retaining portion provided along the fabric for retaining the loop members.

11. The structure of claim 8, wherein each loop member has a first side edge and a second side edge, and wherein the first and second overlapping points are provided near the first side edge of the one of the two adjacent loop members and near the second side of the other of the two adjacent loop members.

12. The structure of claim 8, wherein the lower edges of the two adjacent loop members rest on the ground when the loop members are in the expanded position.

13. The structure of claim 8, wherein the second edges of the two adjacent loop members rest on the ground when the loop members are in the expanded position.

14. The structure of claim 8, wherein the hinge portion is positioned vertically with respect to the ground.

15. The structure of claim 8:

wherein the structure has an open configuration with the loop members lying generally parallel to each other, and a closed position with the loop members overlaying each other, and wherein the overlapping points divide each loop member and the one or more fabric of that loop member into first and second panel portions that are disposed on opposite sides of the overlapping points, with the first and second panel portions of one loop member being disposed at an angle with respect to the first and second panel portions of the other loop member when the loop members are pivoted in any position other than the open and closed configurations.

* * * * *